May 16, 1961 J. A. MIKINA 2,984,227
VALVE GEAR TAPPET FOR INTERNAL COMBUSTION ENGINES
Filed July 9, 1959 2 Sheets-Sheet 1
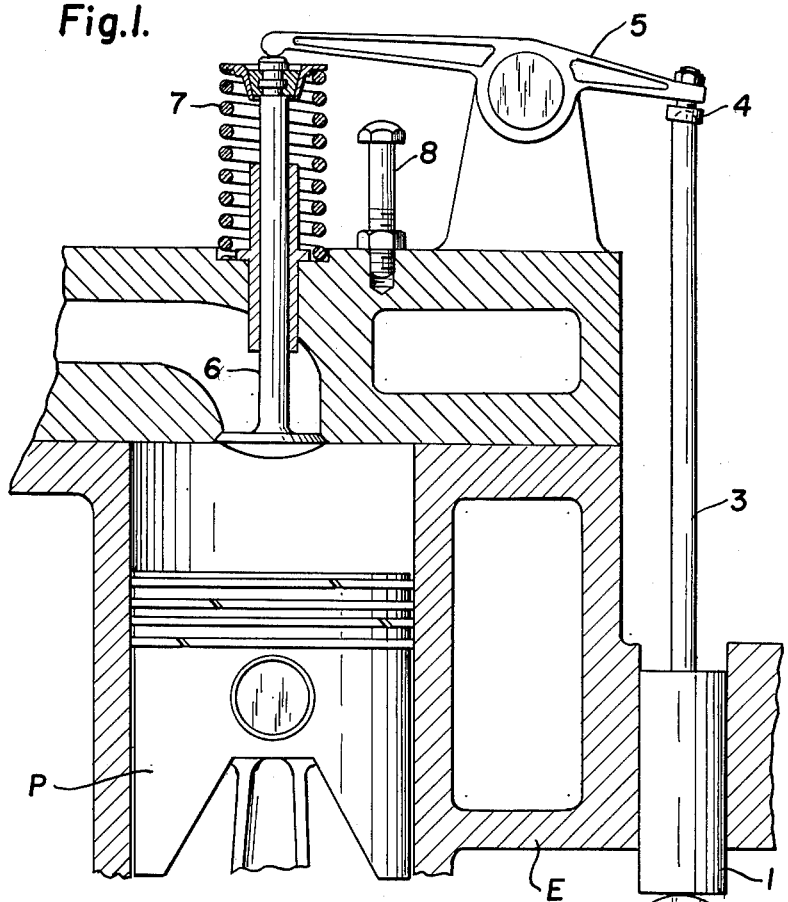
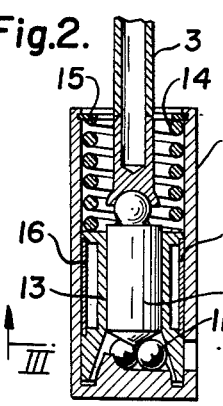
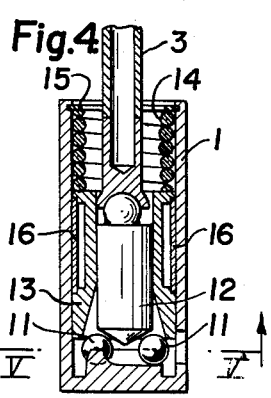
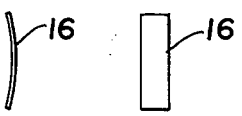
Fig.6a. Fig.6b.
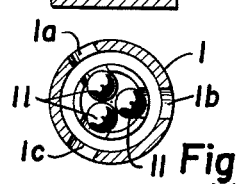
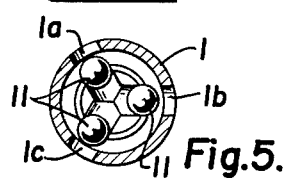
INVENTOR.
John A. Mikina
BY
William J. Ruano
ATTORNEY May 16, 1961 J. A. MIKINA 2,984,227
VALVE GEAR TAPPET FOR INTERNAL COMBUSTION ENGINES
Filed July 9, 1959 2 Sheets-Sheet 2
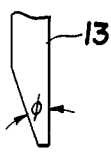
Fig. 7.
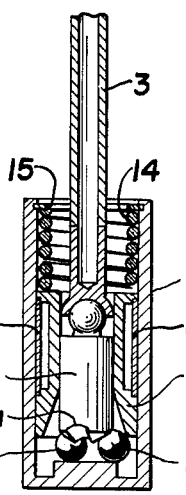
Fig. 8.
Fig. 9.
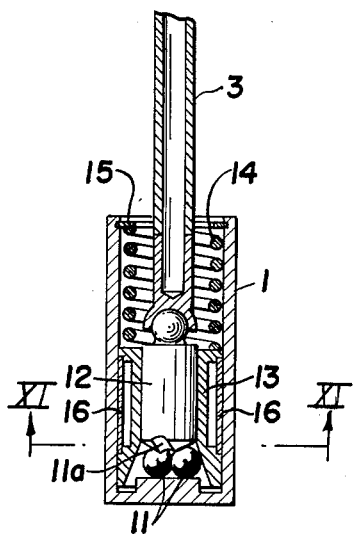
Fig. 10.
Fig. 11.
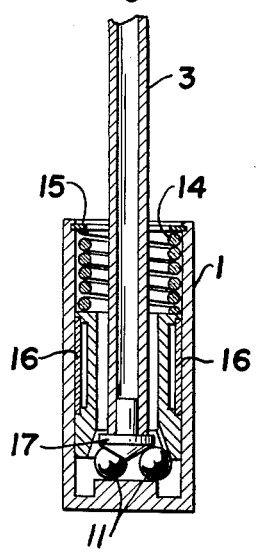
Fig. 12.
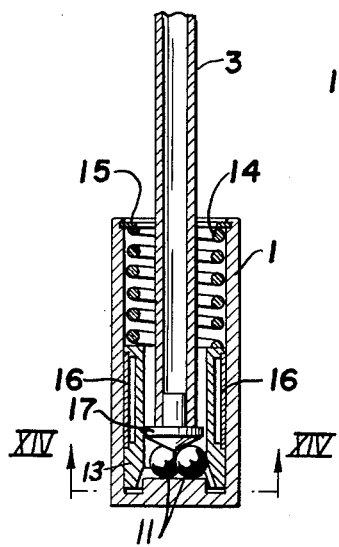
Fig. 13
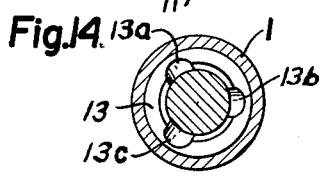
Fig. 14.
INVENTOR.
John A. Mikina
BY
*William J. Ruano*
ATTORNEY United States Patent Office 2,984,227
Patented May 16, 1961

2,984,227

VALVE GEAR TAPPET FOR INTERNAL COMBUSTION ENGINES

John A. Mikina, 17569 Whitcomb Ave., Detroit, Mich., assignor of one-third each to Stanley Mikina and Valerie Mikina Filed July 9, 1959, Ser. No. 826,068

7 Claims. (Cl. 123—90)

This invention relates to a valve gear for internal combustion engines and, more particularly, to a self-adjusting mechanical tappet therefor.

In the operation of an internal combustion engine having poppet valves for controlling the intake and discharge of the power cylinder, it is desirable, for its efficient performance, that the valve motion be accurately defined by the geometry of the lifting cam and by the stiffness of the intermediate mechanism between the cam and the valve. At high engine speeds, accelerations of several hundred times gravity are required to open and close the valves in the short available times within the period of revolution of the crankshaft. Consequently, undesirable transients, such as impact against the cam, are caused by any valve gear motion which represents a momentary loss in effective cam lift, such as excessive elastic deflections or backlash in the mechanism.

The expedients available to the engine designer for avoiding such unsatisfactory valve operation are well known in the art. Elastic deflections of the valve gear are limited by using a light but stiff actuating mechanism having a high natural frequency of vibration, while system lash due to wear or temperature expansion between cam and valve is automatically compensated for by means of hydraulic tappets.

An object of the present invention is to provide a novel, self-adjusting mechanical tappet which has all of the advantages of the hydraulic valve lifter but none of its disadvantages.

While a properly designed and installed hydraulic valve tappet controls valve gear lash in a satisfactory manner most of the time, those familiar with the art will recognize that it is deficient in several respects.

(a) It is subject to malfunction due to dirt in the engine oil supply. The ball check valve within the tappet body will make the lifter inoperative if the check valve is kept from closing by dirt on the ball or valve seat.

(b) It is affected by oil viscosity. During cold weather operation, in particular, valve clatter occurs in the engine during the initial period when the cold oil is too viscous to flow into and properly fill the hydraulic tappet.

(c) It is subject to malfunction due to entrained air in the oil supply. Loss of engine valve lift will occur due to the increased compressibility of the oil-air mixture, and transient separation and impact in the valve gear will be induced by the excessive elastic deflections of the hydraulic medium.

(d) It is subject to malfunction as a result of overpumping of oil into the tappet oil cylinder. When separation of the cam and tappet occurs during high acceleration transients, oil flow into the tappet cylinder causes the tappet to lengthen, thus keeping the engine valve off its seat when in the closed position.

(e) The tappet piston diameter is small in order to limit the cam loading due to engine oil pressure during the non-lifting phase of cam operation. Hence, the tappet piston must be very closely fitted into its cylinder in order to reduce loss of engine valve lift during the lifting phase due to oil leakage past the tappet piston. The necessity for close dimensional and finish control of the tappet piston, cylinder, and check valve seat increases the cost of manufacture, assembly, and inspection.

My self-adjusting mechanical tappet requires no hydraulic medium for its operation, but functions principally by virtue of normal and frictional forces between the geometric surfaces of its rigid hardened steel parts. It is thus able to compensate for lash in the valve gear system without the disadvantages listed above for the hydraulic valve tappet. Moreover, through a novel juxtaposition of spring and friction forces and of the geometry of the load carrying surfaces within the tappet, lash in the valve gear system is effectively taken up without imposing any large loads on the cam and tappet during their non-lifting phase of operation, when the tappet rides on the cam base circle.

An object of my invention is to provide a valve gear tappet for internal combustion engines which is devoid of the above named disadvantages of hydraulic valve tappets and which consists only of mechanical parts devoid of hydraulic liquid, yet which is highly effective in automatically compensating for backlash in the valve gear system.

A more specific object of my invention is to provide a novel mechanical tappet for the valve operating mechanism or gear of an internal combustion engine, which tappet includes relatively slidable, hardened steel parts which, by virtue of normal and frictional forces between the geometric surfaces thereof, automatically compensate for lash in the valve gear system.

Other objects and advantages of my invention will become more apparent from a study of the following description of exemplary forms of the invention when taken with the accompanying drawings wherein:

Fig. 1 is a vertical, cross-sectional view of a portion of an internal combustion engine, showing a piston in the engine block, and a valve operating gear or mechanism including a mechanical tappet embodying the principles of the present invention;

Fig. 2 is an enlarged, vertical cross-sectional view of the mechanical tappet shown in Fig. 1, showing the position of the parts when tappet body 1 is farthest from push rod 3;

Fig. 3 is a cross-sectional view taken along line III—III of Fig. 2;

Fig. 4 is a view similar to Fig. 2 but showing the parts when tappet body 1 is in the state of nearest approach to push rod 3;

Fig. 5 is a cross-sectional view taken along line V—V of Fig. 4;

Figs. 6a and 6b are side and front views of the leaf spring shown in Figs. 2 and 4;

Figs. 7 and 8 are fragmentary views of members 12 and 13, respectively, of Figs. 2 and 4;

Fig. 9 is a vertical cross-sectional view of a modification of the mechanical tappet showing the parts when tappet body 1 is in a state of nearest approach to push rod 3;

Fig. 10 is a view similar to Fig. 9, except showing the parts when tappet body 1 is farthest from push rod 3;

Fig. 11 is a cross-sectional view taken along line XI—XI of Fig. 10;

Fig. 12 is a vertical cross-sectional view of a further modification of the mechanical tappet showing the parts when tappet boy 1 is in the state of nearest approach to push rod 3;

Fig. 13 is a view similar to Fig. 12 but showing the position of parts when tappet body 1 is farthest from push rod 3; and Fig. 14 is a cross-sectional view taken along line XIV—XIV of Fig. 13.

Fig. 1 shows how my self-adjusting mechanical tappet may be applied in the valve gear, for example, for actuating over-head valves in the internal combustion engine block E having a piston P. The tappet body 1 is positioned by a guide bearing in the engine block E in the usual way and acts to transmit the rise of cam 2 above its base circle to push-rod 3 and thence rocker arm 5 and the stem of engine valve 6 against the force of valve spring 7. An adjusting screw 4 is interposed between rod 3 and rocker arm 5 and is used in conjunction with stop screw 8 for putting the internal tappet mechanism into its proper self-adjusting range, as will be described later.

The internal mechanism of the tappet is shown in Figs. 2 to 8 inclusive. Within the tappet body 1 is located a plurality of hardened steel balls 11 so situated as to be in contact with the inner base of tappet body 1, with the outer cone of the end of member 12, and with the inner cone of member 13. In this embodiment, the inner base of the tappet body is drilled and reamed to form three equally spaced radial grooves or races $1a$, $1b$ and $1c$ for the balls. The ball and cone assembly is kept together in contact by means of a loading spring 14 which is retained within body 1 by means of a snap ring 15. Additionally, a plurality of flat springs 16 (see Figs. $6a$–$6b$) distributed in the peripheral space between body 1 and member 13 imposes normal radial forces between these two parts which produce axial friction forces impeding the displacement of member 13 relative to the tappet bore 1. The springs 16 are initially bowed in their free state and develop their spring loading as they are forced to assume a straight position in the annular space between member 13 and tappet body 1 during assembly of the tappet.

The function of the ball and cone geometry is to give the force of spring 14 a large mechanical advantage relative to push rod 3 so that a comparatively small and light spring 14 is able to oppose a large part of the large load force acting on push rod 3 and the tappet body 1. The remainder of the load forces of push rod 3 which are not equilibrated by spring 14 are balanced by the axial friction forces of springs 16 and by the friction forces acting between the steel balls and their contacting surfaces on members 1, 12 and 13.

During the valve lifting phase of the cam operation, the various friction forces within the tappet mechanism add their effect to that of spring 14 in developing reactions that enable the valve lifting load to be transmitted from cam 2 to push-rod 3. However, during the dwell period when the tappet rides on the cam base circle, these internal friction forces oppose the force of loading spring 14, with the result that only a comparatively small difference of loading appears between the tappet body and the cam. This is highly advantageous in that it prolongs the cam and tappet life by restricting the wear of the sliding cam and tappet surfaces substantially only to that part of the cycle of operation wherein the tappet contacts the part of the cam above its base circle.

The operation and the advantages of the friction-restrained ball-cone-spring combination are amenable to mathematical analysis and may be set forth simply as follows. When the system lash has been taken up, the subsequent displacements of the internal tappet mechanism relative to the tappet body are so minute (of the order of microinches of surface strain) that the force equilibrium of the parts can be treated as a problem in statics. On that basis, if $F_{14}$=force of loading spring 14
$F_{16}$=total radial force of flat spring assembly 16
$\mu$=coefficient of friction between the metal surfaces within the tappet
$\phi$=half of the apex angle of the external cone on member 12
$\theta$=half of the apex angle of the internal cone on member 13 then the maximum valve lifting force $F_3$ that can be transmitted through the tappet to push-rod 3 without internal slipping of the ball-cone mechanism is given by the following equation:

$$F_3 = (F_{14} + \mu F_{16}) \frac{(\tan \phi + \mu)(1 + 2\mu \tan \theta - \mu^2)}{(\tan \theta - \mu)(1 - 2\mu \tan \phi - \mu^2)} \quad (1)$$

The effectiveness of the friction-restrained ball-and-cone geometry in reducing the force and energy requirements at spring 14 is illustrated by the following example.

Let
$$\tan \phi = 2$$
$$\tan \theta = \tfrac{1}{3}$$
$$\mu = \tfrac{1}{10}$$

Then, from Eq. 1,
$$F_{14} + \mu F_{16} = .0612 F$$

Let
$$\mu F_{16} = \tfrac{3}{4} F_{14}$$

Then
$$F_{14} = .035 F_3$$

Thus, for $F_3 = 500$ lbs., $F_{14}$ needs to be only 17.5 lbs.

Examination of Eq. 1 shows that, in theory at least, $F_{14}$ could be reduced still further by increasing $\phi$ and reducing $\theta$. Ultimately, the tappet mechanism could be made irreversible and the force of spring 14 would go to zero. That condition would be realized by setting the denominator of Eq. 1 equal to zero. In that case, $$\tan \phi = \frac{1 - \mu^2}{2\mu} \quad (2)$$

and
$$\tan \theta = \mu \quad (3)$$

I approach, but do not wish to reach, this condition in my self-adjusting tappet, since I wish to have a good range of lash take-up without excessive size of member 12 and excessive vertical displacement of member 13. Also, if the tappet mechanism were completely irreversible, then if the tappet got longer during an acceleration transient, it would not be able to reach its correct length by a progressive shortening during subsequent cycles of operation.

Therefore, to avoid irreversibility in the internal mechanism of the tappet, the design criteria to be observed are:

$\tan \theta > \mu$ (In the example, $\tan \theta = .33$, $\mu = .1$)

and
$$\tan \phi < \frac{1 - \mu^2}{2\mu}$$

or $\tan \phi < 4.95$ for $\mu = .1$ (In the example, $\tan \phi = 2$)

Equation 1 gives the relation between the tappet forces during the phase of the tappet operation when it contacts the cam profile above its base circle. During the dwell period, then the engine valve is closed and the tappet rides on the cam base circle, tappet spring 14 tries to lengthen the tappet, i.e. to move the balls inward and the tappet body 1 downward. In doing so, all of the friction forces within the tappet mechanism are reversed, and the relation between the tappet forces is now given by $$F_3 = (F_{14} - \mu F_{16}) \frac{(\tan \phi - \mu)(1 - 2\mu \tan \theta - \mu^2)}{(\tan \theta + \mu)(1 + 2\mu \tan \phi - \mu^2)} \quad (4)$$

This equation can be derived by writing down the conditions for equilibrium of parts 11, 12 and 13, as was done in deriving Eq. 1. More simply, Eq. 4 can be obtained from Eq. 1 by reversing the sign of all $\mu$ which are to the first power. For our example, Eq. 4 gives $$F_3 = 2.91(F_{14} - \mu F_{16})$$

It is apparent that the friction force $\mu F_{16}$ must be less than $F_{14}$ if the loading spring 14 is to be able to lengthen the tappet to take up lash, since $F_{14}$ and $\mu F_{16}$ work in opposition for downward displacements of member 13. We assumed previously that $$\mu F_{16} = \frac{3}{4} F_{14}$$

On that basis $$F_3 = 2.91 \times \frac{1}{4} \times 17.5 = 12.7 \text{ lbs.}$$

This, therefore, represents the load between the cam and the tappet during their period of contact at the cam base circle.

Since $F_{14} = 17.5$ lbs., the required axial friction force in our example is 13.3 lbs. Since $\mu = \frac{1}{10}$, the total normal force of springs 16 is $10 \times 13.13$ or 131.3 lbs. This can readily be obtained by means of 10 flat springs each $\frac{3}{4}''$ long, $\frac{15}{64}''$ wide, and .025" thick, bent to an initial deflection of $\frac{1}{32}''$ at the middle and then forced to assume a straight position in the assembled tappet. By using such a comparatively large number of spring strips, better control of the friction force $\mu F_{16}$ is obtained, since wear at the spring surfaces is reduced. Alternatively, in the interests of economy and ease of manufacture and assembly, only a few flat springs may be used to produce the required axial friction force.

The friction-restrained ball-and-cone mechanism is thus, in the example cited, able to develop a lifting force of 500 lbs. on the valve push-rod without internal slip of the mechanism, while during dwell the mechanism can take up lash by lengthening the tappet and produces only a 12.7 lb. loading on the cam base circle. It is to be noted that the force on rod 3 is substantially equal at all times to the force between tappet body 1 and the cam 2, since the tappet is an otherwise unsupported element interposed between the cam and the push-rod. Without an additional stationary fulcrum point it is impossible to gain any mechanical advantage of the cam force relative to the push-rod force. However, I do not seek such a mechanical advantage, but rather one within the internal mechanism of the tappet that will permit a comparatively weak spring 14 to equilibrate a push-rod force which is, for example, about thirty times greater than the spring force, without collapse of the tappet internal mechanism.

In order to distribute the internal tappet load substantially equally among the load transmitting balls 11, it is desirable that they be equally spaced. In the embodiment of Fig. 2, this is effected by providing three equally spaced grooves or races in the inside base of tappet body 1. An equally effective means for spacing the balls is to provide grooves or races in either one or all of the parts which touch the balls. Thus, in Fig. 11 the ball races 11a, 11b, 11c are on the conical end of the inner member 12, while in Fig. 14 the ball races 13a, 13b, and 13c are machined on the internal cone of member 13.

Any variable angularity of the push-rod axis relative to the tappet axis is accommodated, as usual, by means of a ball and socket joint between the push-rod and the upper end of the inner member 12, as shown in Figs. 2 to 11 inclusive.

In the embodiment of Fig. 12, wherein the load carrying balls are centered by the grooved slanted races of member 13, it is possible to put conical member 17 rigidly on the end of push-rod tube 3 and to permit the push-rod to rock slightly on the equally spaced balls.

The amount of lash take up possible in this self-adjusting tappet depends on the system geometry. For example, in the embodiments shown in Figs. 2 to 14 inclusive, three $\frac{1}{4}''$ dia. steel balls are capable of supporting a push-rod force of 500 lbs. and have a lash take up range of about $\frac{3}{64}''$. With a cone slope of $\frac{1}{2}$ on member 12 or 17 when measured from the horizontal, the horizontal displacement of the balls for this lash range becomes $\frac{3}{32}''$. An internal cone slope of 3 on member 13 then results in a vertical displacement of member 13 equal to $\frac{9}{32}''$. Spring 14 can be proportioned to be closed solid for this displacement, thus providing an upper stop for member 13 to prevent balls 11 from moving out past the lower edge of cone 13 and off the cone surface.

Figs. 4, 9 and 12 show the tappet mechanism in its state of nearest approach to push-rod 3. In this state, the balls 11 are at their outermost position from the tappet axis. During operation of the engine, as the tappet body 1 needs to move closer to the actuating cam to take up clearances developed due to wear or temperature effects, the balls are gradually displaced toward the tappet axis, until they contact each other at their innermost positions as shown in Figs. 2, 10 and 13. The ball displacements are usually quite minute over a given period of time measured in weeks or months, since they are automatically only just large enough to keep up with the slowly developing cam and tappet wear. Thus, over the short period of time involved in one cycle of engine valve lift, the tappet mechanism behaves to all intents and purposes as a solid rigid body rather than as a loose-jointed system of separate parts. Little or no wear will take place between the balls and their contacting surfaces, as well as between springs 16 and the tappet bore, since their relative motion is a very slowly progressing creeping displacement.

In order to bring the tappet into its proper point within its range of self-adjustment during installation on an engine, the straightforward procedure illustrated in Fig. 1 may be employed. It consists of the following steps.

(1) With the tappet on the cam base circle, take-up screw 4 on the rocker arm is brought into contact with push-rod 3 so as to take out all lash. In this condition, the tappet balls are at their innermost position and the tappet body is at its lowest position relative to push-rod 3.

(2) The cam is then turned until the tappet is on the cam nose and the engine valve is fully open. At this point bring up adjusting screw 8 until it just touches the rocker arm.

(3) Screw 4 can now be turned down so as to displace the push-rod downward into the tappet mechanism and to cause the tappet balls to move to their outermost position. The large reaction force on the rocker arm accompanying this turning down of adjusting screw 4 is thus provided by screw 8, since valve spring 7 is inadequate to overcome the friction-restrained force of loading spring 14.

If the engine geometry and heat distribution are such that the push-rod system must shorten a few mils after engine warm up, screw 4 may be turned down in operation 3 only far enough to allow the tappet balls an additional .010" or so possible travel before they reach their outermost position and spring 14 is closed solid. Thus, in our example in which the total lash take up is .048 in., if screw 4 is turned down .038" in operation 3, the self-adjusting tappet will allow the push-rod-tappet assembly to shorten .010" to accommodate a lengthening of the engine valve stem or other parts due to temperature expansion. The lash take up range for the cold engine is thus .038" and increases to the full .048" for the hot engine.

Thus it will be seen that I have provided an efficient mechanical tappet which is devoid of hydraulic fluid and its inherent disadvantages and which comprises mechanical automatic take-up means for automatically compensating for lash; furthermore, I have provided a tappet having a mechanical, automatic take-up means disposed in an optimum manner so as to provide immediate take-up for lash and provide reliable valve operation throughout the entire life of the valve gear.

While I have illustrated and described several embodiments of my invention, it will be understood that these are by way of illustration only, and that various changes and modifications may be made within the contemplation of my invention and within the scope of the following claims.

I claim:

1. In an internal combustion engine having tappet valves for controlling the intake and discharge of the power cylinder, valve gear means including tappet means slidably mounted in the block of said engine, and automatic, reversible, mechanical take-up means for automatically compensating for lash comprising relatively slidable spring-loaded parts enclosed within the body of said tappet means including a spring frictionally biased against the interior wall surface of said body for providing substantial frictional resistance to sliding movement of said parts in both directions.

2. Apparatus as recited in claim 1 wherein said tappet means includes a hollow cylindrical tappet body having a slidable plunger axially disposed therein, spring means between said plunger and body for providing substantial frictional resistance to movements of said plunger, a push-rod connected to one end of said plunger, a camming surface at the other end of said plunger, transmission means disposed in contacting relationship with a bottom seat inside said body and with said camming surface, said transmission means being disposed so as to move substantially radially outwardly while maintaining said contacting relationship, and spring biased means acting on said transmission means for restraining said radially outward movement thereof.

3. Apparatus as recited in claim 2 wherein said spring-biased means comprises a substantially cylindrical sleeve slidably mounted within and axially of said body and having a camming surface at one end in engagement with said transmission means, and a spring at the other end of said sleeve yieldingly urging said sleeve and transmission means in contacting and camming relationship.

4. In an internal combustion engine having a tappet valve for controlling the flow of combustible fluid in the cylinder and valve gear for operating said valve, said valve gear including a tappet comprising a hollow cylindrical body, mechanical, automatic take-up means contained within said body and comprising a plurality of spring loaded parts in camming relationship disposed in a manner so as to automatically take-up and compensate for lash and including leaf spring means frictionally engaging an inner wall surface portion of said body for providing substantial resistance to relative sliding movement of said parts.

5. A tappet for valve gear of an internal combustion engine comprising a hollow cylindrical body and a push-rod having one end extending into said body, a plurality of transmission balls, a plunger axially slidable in said body engaging said push-rod, at one end, and having a substantially conical surface at the other end in contacting relationship with said balls so as to force them substantially radially outwardly as the result of movement of the plunger towards the balls, and spring-biased means, also in camming relationship with said balls urging them in a substantially radially inward direction to restrain said radial outward movement, said spring biased means including at least one leaf spring engaging the inner wall surface of said body for developing substantial frictional resistance to oppose relative sliding movement of parts within said body.

6. A tappet as recited in claim 5 wherein said spring-biased means comprises a hollow sleeve telescopically slidable on said plunger within said body in axial relationship, one end of said sleeve having a camming surface in engagement with said balls, a helical spring having one end in engagement with the other end of said sleeve, the other end of said spring being in engagement with said body so as to yieldably urge said sleeve in camming relationship with said balls and restrain radially outward movement thereof, said leaf spring being mounted on the outer surface of said plunger and being bowed outwardly so as to yieldingly and frictionally engage the inner wall surface of said body.

7. A tappet as recited in claim 6 wherein a plurality of said leaf springs are provided on circumferentially spaced points around said sleeve and within cavities formed on the outer surface of said sleeve for enhancing frictional resistance to sliding movement of said sleeve within said body.

References Cited in the file of this patent
UNITED STATES PATENTS

| | | |
|---|---|---|
| 1,915,586 | Williams | June 27, 1933 |
| 2,234,718 | Anglada | Mar. 11, 1941 |
| 2,326,780 | Howard | Aug. 17, 1943 |